US006415809B1

(12) United States Patent
Shellhause et al.

(10) Patent No.: US 6,415,809 B1
(45) Date of Patent: Jul. 9, 2002

(54) FLUIDIC VALVE ASSEMBLIES HAVING IMPROVED FLUIDIC VALVE MECHANISMS, AND DEVICES OPERABLE THEREWITH

(76) Inventors: Ronald Louis Shellhause, 519 Bennert Dr., Vandalia, OH (US) 45377-2509; Doonan Dwight McGraw, 245 Saint James Way, Naples, FL (US) 34104-6715

(*) Notice: Subject to any disclaimer, the term of this patent is extended or adjusted under 35 U.S.C. 154(b) by 0 days.

(21) Appl. No.: 09/602,200

(22) Filed: Jun. 22, 2000

Related U.S. Application Data (60) Provisional application No. 60/140,543, filed on Jun. 23, 1999, and provisional application No. 60/160,578, filed on Oct. 20, 1999.

(51) Int. Cl.[7] .................................................. G05D 7/00
(52) U.S. Cl. ............... 137/115.06; 60/585; 137/115.12; 137/596.17
(58) Field of Search ........................ 60/585; 137/115.06, 137/115.12, 596.17

(56) References Cited

U.S. PATENT DOCUMENTS 5,348,040 A * 9/1994 Shellhause ................ 60/585 X

* cited by examiner

Primary Examiner—Gerald A. Michalsky (57) ABSTRACT

A fluidic valve assembly having a fluidic valve mechanism similar to the mechanisms in U.S. Pat. Nos. 5,003,780 and 5,348,040 provided with improved valve positioning devices which provide improvements in providing the force to move the valve members, and in positioning fluidic valve members in their valve chambers so that the valve members open and close a chamber port, depending upon the direction of fluid flow through the valve chamber. Such devices include providing cam ears on a flow sensitive positioning blade to improve valve position and freedom of the valve member to be moved by fluid flow; the provision of a device using the force multiplication advantage of a toggle arrangement to increase the force acting on a valve member to open it, for example; use of a flow rod timed with the action of a positioning blade construction on a valve member; and use of an outside power source such as a solenoid actuated element acting in conjunction with a valve positioning blade arrangement to open and close a valve member, particularly in vehicle ABS and/or traction control systems, while providing such systems with mechanical/hydraulic backup in case of electrical failure so that the vehicle continues to have controllable vehicle braking that will function adequately as needed until the electrical failure has been analyzed and repaired.

18 Claims, 4 Drawing Sheets

FLUIDIC VALVE ASSEMBLIES HAVING IMPROVED FLUIDIC VALVE MECHANISMS, AND DEVICES OPERABLE THEREWITH

CROSS-REFERENCE TO RELATED APPLICATIONS AND CLAIMS OF PRIORITY

Claims of priority and benefit of earlier filing dates are based on the disclosures of U.S. Provisional Applications Ser. No. 60/140,543 filed Jun. 23, 1999, and Ser. No. 60/160,578 filed Oct. 20, 1999, by the applicants Ronald Louis Shellhause of Vandalia, Ohio, and Doonan Dwight McGraw of Naples, Fla., who are the inventors named in this U.S. Patent Application as the inventors of the invention herein disclosed and claimed. The above-identified Provisional Applications fully comply with 35 U.S.C. 119(e) (2).

BACKGROUND OF THE INVENTION

The disclosures and claimed inventions of U.S. Pat. Nos. 3,913,327; 5,003,780; 5,133,349; 5,182,911; 5,261,235; and 5,348,040 provide the background for the invention disclosed and claimed herein.

SUMMARY OF THE INVENTION DISCLOSED

Broadly, the invention disclosed herein is directed to the following species or variations of fluidic valve assemblies having improved valve mechanisms.

A fluidic valve assembly having the improved valve mechanism CE which is an improvement on the fluidic valve mechanisms of the above-identified U.S. Pat. Nos. 5,003,780 and 5,348,040. This improved fluidic valve assembly with the improved valve mechanism CE is termed a mechanism having a cam-eared blade, the blade being another name for the valve member positioning device which plays a major part in the positioning the valve member of the assembly or mechanism under various fluid flow conditions. The drawings and description of the valve mechanism in U.S. Pat. No. 5,348,040 are particularly pertinent as a predecessor valve mechanism and are therefore incorporated herein by reference.

A fluidic valve assembly having the improved valve mechanism SV is based generally on the fluidic valve mechanism disclosures of the above-identified U.S. Pat. Nos. 5,003,780 and 5,348,040 and the above-noted fluidic valve mechanism CE, as well as any of the other fluidic valve assemblies or mechanisms disclosed herein, having an applied force device which when actuated forcibly opens the fluidic valve of the mechanism for distribution of fluid pressure through the valve. The applied force can be generated by powered devices such as solenoids, differential pressure actuated or electrical power actuated servomotors. The applied force generating devices may be linear or rotary electrically powered devices such as axially or rotary actuating solenoids, servomotors, stepping motors, selsyn motors and the like.

A fluidic valve assembly having the improved valve mechanism TB is based generally on the fluidic valve mechanism disclosures noted above and having a toggle blade which takes advantage of the exponential force that can be generated through the blade toggle arrangement. The toggle blade is a specific fluidic valve member positioning device having a toggle action and construction.

A fluidic valve assembly having the improved valve mechanism FR has a flow rod positioned in axial alignment with a fluid flow passage so as to deliver force to a fluidic valve assembly or mechanism, preferably but not necessarily of the type of fluidic valve assembly having the improved valve mechanism identified as TB above. While not separately shown, it is to be understood that other types of fluidic valve mechanisms may be employed.

The force delivered by the flow rod is timed to coincide to begin actuation of the toggle blade valve positioning device, and as the toggle blade device progresses to opening the fluidic valve and enters its most efficient stage, the flow rod passes through the fluid flow restriction in which the delivered force was created, after which the force is drastically reduced so as to be of no substantial effect on the toggle blade positioning device. The flow rod resets itself upon reverse apply flow through the flow restriction. Typically, the first above-described force delivery occurs when the flow valve is opened to release pressure under return flow, and the resetting of the flow rod occurs upon apply flow of fluid through the fluid flow restriction in the opposite direction from release flow.

Devices such as vehicle brake systems, whether manually or power operated, and whether or not having an ABS brake control system and/or a traction control system incorporated therein, can employ any of these fluidic valve assemblies having any of these improved valve mechanisms. One schematically disclosed example is the combination of one or more of the disclosed fluidic valve assemblies having one or more of the improved valve mechanisms in an ABS brake control system. The SV type fluidic valve mechanism is particularly useful in ABS and traction control systems.

BRIEF DESCRIPTION OF THE DRAWINGS

FIGS. 1, 2(a) and 2(b) relate to the fluidic valve assembly having the improved valve mechanism CE. More particularly:

FIGS. 4 and 5 are generally similar to FIGS. 1, 2(a) and 2(b), and relate to a fluidic valve assembly having the improved valve mechanism TB. Some of the other FIGURES also show a improved valve mechanism TB as a part of the overall FIGURE showing. More particularly:

DETAILED DESCRIPTION OF THE DISCLOSURES

Figure 1:
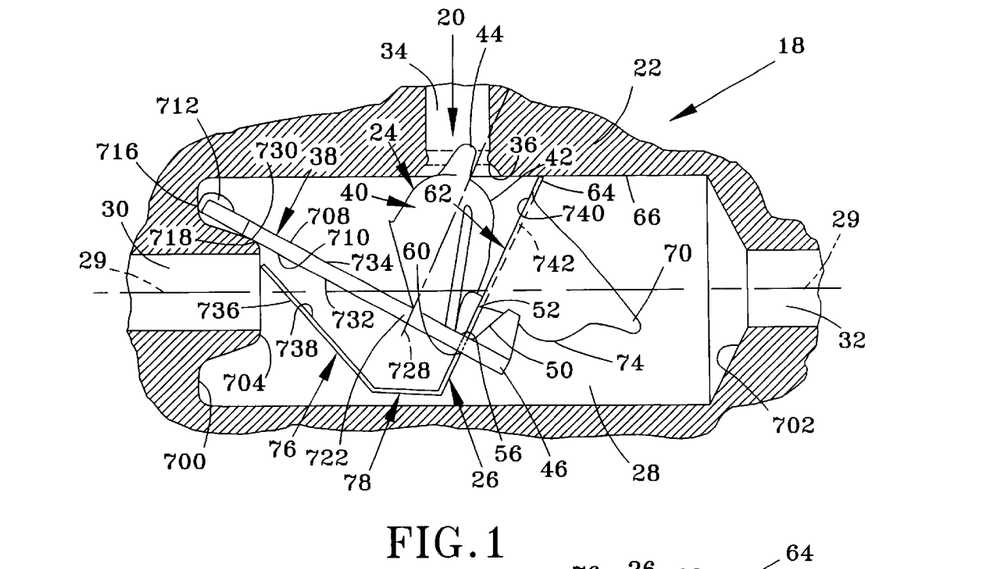
FIG. 1 is a fragmentary cross section view of a fluidic valve assembly having the improved mechanism CE, which has the cam-eared construction installed in a valve housing which can form a part of an entire valve assembly using the valve mechanism CE.

The valve assembly 18 of FIG. 1 has a valve mechanism 20 provided with a cam-eared positioning device as described broadly above. The valve mechanism 20 includes the valve housing 22, the valve member 24 and the cam-eared positioning device or blade 26.

Housing 22 defines a valve chamber 28, one end of which has an inlet/outlet port 30. The term "inlet/outlet port" is used herein because under some fluid flow conditions any one or more of the ports may be an inlet port for fluid flowing into the valve chamber 28 or an outlet port for fluid flowing out of the valve chamber 28. As the description proceeds, it will be clear about the fluid flow circumstances when each of the inlet/outlet ports is acting as an inlet or an outlet.

The other chamber end has another inlet/outlet port 32. A third inlet/outlet port 34 connects with the valve chamber 28 through one side of the housing portion defining the chamber. Port 34 has a valve seat 36 formed thereon. Various connections to these ports are provided as shown in some of the system schematic FIGURES.

Figures 2A, 2B:
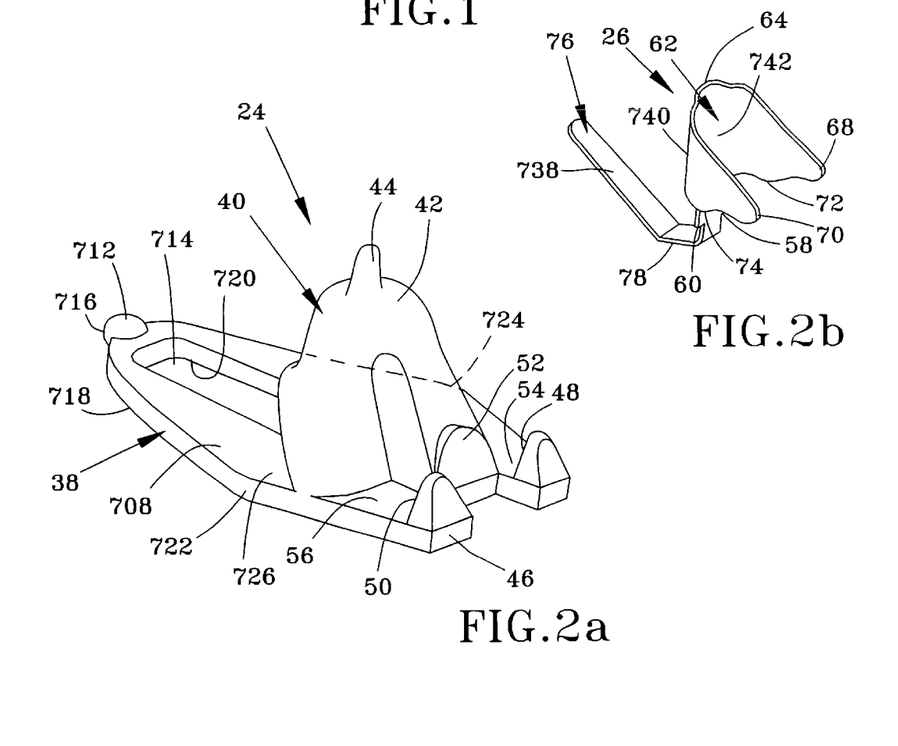
FIG. 2(a) is an isometric view of the valve member of the improved valve mechanism CE of FIG. 1.
FIG. 2(b) is an isometric view of the positive positioning device or blade having cam ears and which cooperates with the valve member of FIG. 2(a) to form the valve mechanism CE.

Valve member 24, shown in perspective in FIG. 2(a) has a base 38 which is shaped to locate the remainder of the valve member 24 within the valve chamber 28. See the valves of U.S. Pat. No. 5,348,040 for a similar valve and valve location arrangement. The main part 40 of the valve member 24 extends upwardly from base 38 as an irregularly formed tower extending to a valve seat sealing surface 42. This surface is spherical so as to match the seat contour, which is also spherically formed. The tip 44 at the upper end of the main body tower is a piloting tip.

On end 46 of base 38 are a pair of laterally spaced stops 48 and 50. These stops are apply flow positioning stops for the blade 26. A return flow positioning stop 52 is formed on the base of the tower forming the main body part 40. The upper surface of the base 38 near base end 46 between the apply and return stops 48, 50 and 52 forms fulcrum lands 54 and 56 for the blade 26. Lands 54 and 56 are immediately adjacent the apply stops 48 and 50 and are on either side of the return stop 52.

Blade 26 has portions 62 and 76 joined by another portion 78 so that the main part 40 of the valve member 24 and most of the base section 38 are within the angle formed by portions 62 and 76 as viewed in FIG. 1. Blade 26 has laterally spaced fulcrum points 58 and 60 on which the blade pivots on fulcrum lands 54 and 56 to the extent limited by the apply stops 48 and 50 and the return stop 52. The upper part 62 of the blade above the fulcrum points 58 and 60 has a bore engaging point 64 which holds the valve seat sealing surface 42 out of engagement with the valve seat 36 when it is engaged with the valve chamber bore surface 66. Ears 68 and 70 are bent outward from the blade upper cart 62 on either side of that upper part. Cam surfaces 72 and 74 are respectively formed on the bottoms of ears 68 and 70. Thus, the blade is referred to as a cam-eared blade. When the valve member 24 is in its at-rest, open position, the blade rests against the apply stops 48 and 50 and the cam surfaces 72 and 74 form pivoting points in contact with the valve chamber bore surface 66 at laterally spaced points on the lower half of the bore surface as seen in FIG. 1. The points where cams 72 and 74 make contact with the valve chamber side wall surface 66 are therefore chordally opposed and below the valve chamber axis 29. The contact of the cams 72 and 74 with the valve chamber bore surface 66 raises the blade fulcrum points 58 and 60 slightly away from the fulcrum lands 54 and 56. The bore surface then supports the majority of the mass of the blade 26 in a balanced-open position. The masses of the ears 68 and 70 contribute to the pivoting of the blade 26 to this open position.

When the master cylinder generates brake apply pressure, there is brake fluid entering chamber 28 through port 30. This flow acts on the valve base 38, raising the valve member 24 until the fulcrum lands 54 and 56 engage the fulcrum points 58 and 60 of blade 26, at which time the flow impinging on the activating tab portion 76 of blade 26 and the underside of valve member base 38 causes the blade 26 and the valve member 24 to move together to close the valve member surface 42 against the valve seat 36. The blade 26 and valve member 24 are sensitive to a very small amount of fluid flow to accomplish this. The amount of fluid flow rate required is typically only about 0.04 of one cubic inch per minute (c.i.m.). Thus, assuming that it would take a vehicle operator one second to push on a brake pedal to move enough fluid to achieve this flow rate, only 0.0006667 of one cubic inch of fluid would actually be moved.

Activation to close or open the valve member area 42 relative to valve seat 36 can occur at even lesser fluid flow rate values than 0.04 c.i.m. when there are variable surge flow rates occurring. These actions are virtually certain to occur with flow rate values of 0.04 to 0.06 c.i.m. When a vehicle is being braked, these flow rates are much higher than any of these values. In fact, many engineers have tried to achieve such a low flow rate that the valve would not be actuated, and have found that it requires such a fine touch and such a slow movement of even a directly connected brake pedal that, without watching a valve in a clear plastic housing can they even approach it. For this reason, for all practical matters, the valve acts instantaneously. This is true even if there are several valves which would be expected to begin activation in series.

When the brakes are being released by release of the vehicle brake system's brake pedal, the opening of the valve from its seat 36 is accomplished by a combination of brake release return flow entering the valve chamber 28 from port 32 and impinging on the blade upper part 62. With the pressure drop across the valve member 24 and the blade 26, the blade 26 is moved to engage the valve member return flow stop 52 near the blade fulcrum points 58 and 60, and also engages the blade bore engagement point 64 with the bore surface 66. This is the valve member and blade position shown in FIG. 1. As long as return flow continues at high or low rates of flow through port 32 into chamber 28, the blade 26 will hold the valve away from its seat 36, allowing the return flow to the reservoir through the valve seat 36 and port 34, and also to return to the master cylinder through port 30. When there is no more return flow, the valve member 24 will settle further downward to the bottom of chamber 28 and assume the at-rest position previously described.

A still more detailed description of the fluid flow valve assembly 20 of FIG. 1 and the portions of that assembly shown in FIGS. 2(a) and 2(b) now follows.

The fluid flow sensitive valve assembly 18 comprises the housing 22 having the CE type of valve mechanism 24 received in the valve chamber 28 formed in housing 22. The valve chamber has a preferably cylindrical side wall 66, axially spaced first and second end walls respectively identified by the reference characters 700 and 702, and first and second inlet/outlet ports respectively identified by the reference characters 30 and 32 respectively opening through the first and second valve chamber end walls 700 and 702. A third inlet/outlet port 34 opens through the valve chamber side wall 66 through a valve seat 36 at a point axially intermediate the first end wall 700 and the second end wall 702. First end wall 700 has an annular section 704 through which the first port 30 is axially formed in relation to the longituditually extending axis 29 of the valve chamber 28.

The valve mechanism 20 includes the valve member 24 juxtaposed to the valve seat 36. It is movable relative to the valve seat 36 into a seated position to close the third inlet/outlet port 34 and into an unseated position to open the third inlet/outlet port 34. The valve member 24 has a substantially planar body base section 38 defined by an upper base side 708, a lower base side 710, a base first end 712 and a base second end 46. A valve member main body section 40 is a tower-like structure which extends outwardly from the base section upper side 708 intermediate the base section first end 712 and the base second end 46. An opening 714 in the portion of the base section 38 extending between the base first end 712 and the valve member main body section 40 reduces the areas of the base section upper and lower sides 708 and 710 and provides a space for some fluid flow through that part of the base section.

The valve member main body section 40 has an annular surface portion 42 providing a valve seat sealing surface which is selectively engageable in seated relation with the valve seat 36 and disengageable from that valve seat in unseated relation. It also has a piloting tip 44 which extends into the third inlet/outlet port 34. Fluid may flow into and out of the third inlet/outlet port 34 when the valve seat 36 is not closed by the valve surface portion 42. This tip 44 ensures that the valve surface portion 42 is always so aligned with the valve seat 36 and the third inlet/outlet port 34 that the valve surface portion 42 can and will seat against the valve seat 36 in closed relation when the valve member is moved for that purpose. It is preferred that the mating surfaces of the valve seat 36 and the valve surface portion 42 each be formed as an annular portion of a spherical surface so that they have good surface area sealing contact when closed together.

The valve mechanism 24 also includes the valve member positioning device or blade 26. This device is mounted on the valve member 24 and is movable with the valve member as that member's valve surface portion 42 is moved between its seated and unseated positions relative to the valve seat 36. It also has components of movement relative to the valve member 24 as will be further described.

Device 26 has a maximum width less than the diameter of the valve chamber 28 between that chamber's end walls 700 and 702 so that it may move freely to limited extents within chamber 28, as will be further described, and so that some fluid can flow about the device between the device edges and the valve chamber side wall 66. Device 26 may also be referred to as a valve member positioning means, or as a valve member positioning blade. As such, one of the functions of a part of the blade, and therefore applicable nomenclature for that part, is that of a valve movement blocker. Of course, there are also other valve member positioning means or devices disclosed in other drawing figures which are described below. In general, they also have a valve movement blocker part and function.

The device 26 has a portion 62 which is a device end or upper part, sometimes also referred to as the blade upper part. Its outer end 64 is a valve mechanism position location point which is engageable with the valve chamber side wall 66 intermediate the second and third inlet/outlet ports 32 and 34, as is clearly seen in FIG. 1. The valve member 24 also has first position points 716, 718, and 720. Point 716 is on the extreme end of the valve member base end 712, and can engage a part of the valve chamber end wall 700, as seen in FIG. 1. It can also become disengaged from that end wall under some valve member movement conditions. Points 718 and 720 are on the part of the valve member base section lower side 710. These points are on the valve member base end 712 but spaced from point 716, and are separated laterally by the base opening 714. Points 718 and 720 are engageable with the surface 730 of the annular section 704 of valve chamber end wall 700. As shown in FIG. 1, this surface 730 may be slightly rounded. Points 718 and 720 keep the valve member base end 712 located radially outward of the opening of inlet/outlet port 30 into the valve chamber so that the valve member cannot have its extreme end where point 716 is located caught on the annular outer end surface portion annular section 704 and result in the valve mechanism being unable to properly operate.

The valve member 24 also has second position points 722 and 724. More specifically, these are clearance points normally establishing a desired clearance between them and the cylinder end wall, and only in most unusual circumstances does one or the other of them become a position-limiting point. These position points are laterally opposite each other and are formed on opposite edges of a portion 726 of the valve member body section 38 at the widest part of that section. Portion 726 is that part of the valve member body base 38 which extends between the points 718 and 720 and the base second end 46. Points 722 and 724 are preferably located close to a lateral plane passing through the extended axis 728 of the valve member main body section 40.

Figure 6A:
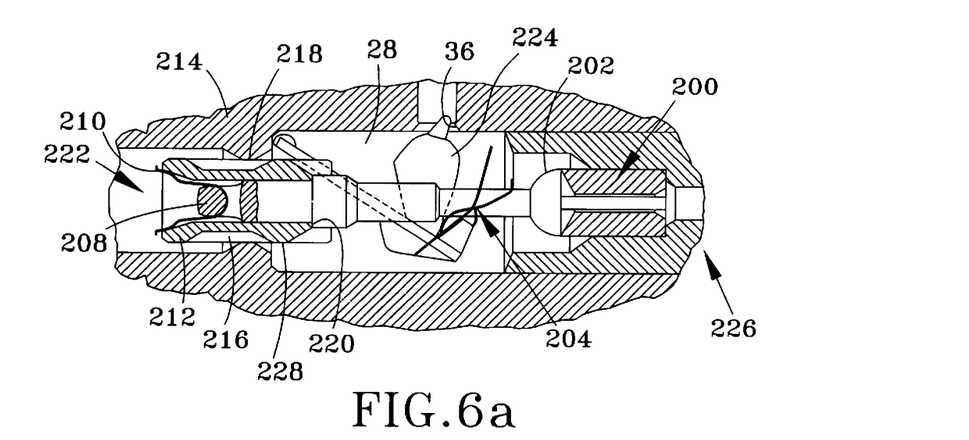
FIG. 6(a) is a fragmentary cross section view, similar to the views of FIGS. 1, 3, and 4, showing a fluidic valve assembly using the improved valve mechanism FR.
Figure 6B:
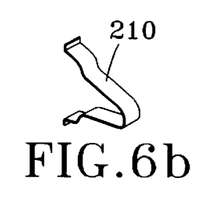
FIG. 6(b) is a perspective view of the two-stage positioning and retention spring of the valve mechanism of FIG. 6(a).
Figure 6C:
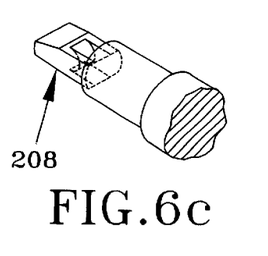
FIG. 6(c) is a perspective view, with a part broken away, of one end of the flow rod of the valve mechanism of FIG. 6(a).
Figure 6D:
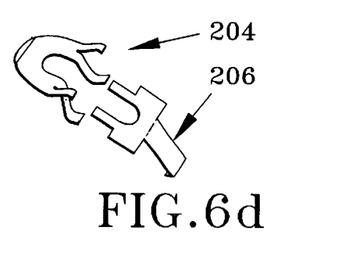
FIG. 6(d) is a perspective view of the two parts of the toggle blade positioning device or blade of the improved valve mechanism of FIG. 6(b).

In normal operation, the second position points 722 and 724 are near but not quite engageable with the valve chamber side wall 66 below the center axis 29 of valve chamber 28 when the valve member 24 is moved to its valve seat open position. This open position of the valve member is shown in FIG. 1, and also FIG. 6 (a), albeit that FIG. 6 (a) discloses a modification of this valve mechanism. This condition, wherein one or the other of the points 722 and 724 might possibly engage the valve chamber side wall 66 because of lateral movement of the valve member 24, prevents the lateral component of any movement of the valve member occurring during its functional operation from removing the valve surface 42 from a position where it cannot thereafter close the valve seat 36. This possible engagement of one or the other of the points 722 and 724 with the valve chamber side wall 66 might be able to occur when the valve seat 36 is open while there is no fluid flow through the valve chamber, and also when there is fluid flow from inlet/outlet port 32 into valve chamber 28 and the valve seat is open to permit the fluid so flowing flows out of that chamber through inlet/outlet port 34. If there should be some lateral movement of the valve member 24 while the valve seat 36 is closed or only partly open, while not normally occurring, one of the points 722 and 724 could possibly engage one side part of the valve chamber side wall and so limit such movement that the valve surface portion 42 and the valve seat 36 retain their functional relationship. The wider width of the base section 38 as it approaches points 722 and 724, resulting in larger effective flow-impingeable surfaces on the base, and the base width of the tower-like valve member section 40 where it joins the base section are the major reasons for the existence of points 722 and 724. They are not provided just to have a possible engagement with the cylinder side wall 66.

There are fluid flow-impinging surfaces 732, 734, 736, 738, 740 and 742 on the valve mechanism 20. Of course, not all of the surfaces 732, 734, 736, 738, 740 and 742 are the recipients of fluid flow impingement at the same time; the particular ones being so impinged at a particular time depends upon the direction of the fluid flow within the valve chamber 28. The fluid flow forces acting on the surfaces being impinged when fluid flow impinges thereon while flowing from the first inlet/outlet port 30 into the valve chamber 28 act to move the valve mechanism 20 from its valve member unseated valve position (where the valve seat 36 is open) to the valve member seated valve position (where the valve seat 36 is closed). The fluid flow forces acting on the surfaces being impinged thereon while fluid is flowing toward the first inlet/outlet port 30 from either or both of the second inlet/outlet port 32 and the third inlet/outlet port 34 act to move the valve mechanism 24 from its valve member seated position to the valve member unseated position relative to the valve seat 36.

The improved valve mechanisms shown in the drawings employ modified valve member positioning means or devices. In the valve mechanism 24 of FIG. 1, this means or device has its first fluid flow-impingeable surface 736 acted on by fluid flow from the first port 30 into the valve chamber 28 to initiate movement of the valve mechanism 24 toward seating the valve member surface 42 on the valve seat 36, closing the inlet/outlet port 34. In addition, the valve member positioning device 26 has the third fluid flow-impingeable surface 740 acted on by the fluid flow from inlet/outlet port 30, also acting to cause the device 26 to pivot on the valve member 24 at 54, 58 and 56, 60, and coordinating with the impingement force on its first fluid flow-impingeable surface 736 to add additional force causing the cylinder side wall end engagement point 64 to be disengaged and moved downwardly as seen in FIG. 1, clearing the way for the valve member surface 42 to be closed against valve seat 34.

With port 34 closed, fluid flowing from port 30 into chamber 28 flows out through port 32 to a suitable mechanism such as a fluid pressure actuated brake to be actuated by fluid pressure. At the same time the planar body section lower side 710 is being impinged by the fluid flow from port 30, and a component of the force created on its lower surface 732 also urges the valve member main body 40 upwardly as seen in FIG. 1, closing the valve seat 36. Thereafter, fluid flow and pressure can be delivered from the source of fluid flow and pressure from port 30 through port 32 to the device utilizing the fluid flow and pressure to be actuated.

These impingements and resultant movements of the components of the valve mechanism 24 occur with the initiation of a very minute rate of fluid flow, so that the port 34 is quickly closed. Usually, in a brake system, for example, port 30 is connected to a master cylinder, port 34 is connected to a brake fluid reservoir, and port 32 is connected to one or more brakes. Because it takes a fluid flow rate of only about 0.04 to 0.06 cubic inches per minute to cause the valve mechanism 24 to close or open port 34, it is apparent that the act of beginning to pressurize a master cylinder, which begins fluid flow through port 30 into valve chamber 28, causes almost instantaneous creation of a closed pressurization path between the master cylinder and the brakes, reducing brake pedal travel, even considering the brake linkage and a power brake booster travel losses, to a nominal amount instead of the typical ½ inch to ¾ inch to begin to build up brake pressure in the brakes.

Once closed, the fluid pressure in the valve chamber 28 continues to act on the valve member 24 while there is only a slight, if any pressure in port 34 (as, for example in a brake system fluid reservoir), creating a pressure differential sufficient to keep the valve closed.

Then, only when the fluid pressure in chamber 28 is lessened by releasing some of the pressure connected to port 30, is there fluid flow between port 34 and the valve chamber 28. Fluid flow from port 32, once begun, immediately impinges on the fourth fluid flow-impingeable surface 742 of the device 26, pivoting the device counterclockwise as viewed in FIG. 1, moving the end point 64 of the device portion 62 upwardly into engagement with the cylinder side wall 66. At the same time, the fluid flow going toward port 30 from port 34 impinges on the second, upper, surface 734 of the valve member base section 38 and on the upper surface 738 of the first portion 76 of the device 24, forcing the valve main body section 40 to be moved downwardly as it pivots on its points 713 and 720 about surface 730 of the annular section 704 of the chamber end wall 700. This opens the valve seat 36, permitting the pressure causing the flow into valve chamber 28 through port 32 to cause the flow to continue out of the chamber 28 through the port 34. As the pressure beyond port 30 is lessened, e.g., by further releasing a brake pedal to further release the master cylinder and therefore decrease this pressure, some of the fluid flow will also flow out of chamber 28 through port 30, keeping the master cylinder or similar device replenished with fluid as it increases its pressure chamber volume. This almost instantaneous opening of the valve port permits much quicker release of the pressurized fluid at port 32, but is still controlled by the pressure in port 30. Any very slight increase of this pressure in port 30 will again cause the flow to reverse sufficiently to both react on the surface 736 of the deactivating tab 76, releasing the positioning device 26 from its locked-open position at point 64, and to cause the valve seat to again be closed as earlier described. In the descriptions of valve mechanism operations, fluid flow from the first inlet/outlet 30 or its equivalents into the valve chamber 28 or its equivalents is a fluid flow signal, which is also identified at time as a first signal. Likewise, fluid flow from the second inlet/outlet 32 or its equivalents into the valve chamber 28 or its equivalents is also a fluid flow signal, which is also identified at time as a second signal. In some of the variations herein disclosed and claimed, there may also be separate fluid flow signals from the first and second signals.

An important feature of the valve member positioning device or blade 26 of FIGS. 1 and 2(*b*) is the provision of the ears 68 and 70 on the second portion and upper part 62 of device 26. These ears provide additional pivot points extending from the second portion 62 of device 26 in generally parallel relation and in a direction generally toward but spaced from the valve chamber end wall 702. These ears 68 and 70 respectively have cam surfaces 72 and 74 thereon, and are so positioned that, when the inlet/outlet port 34 is open, they each engage a point on the valve chamber side wall 66 located on the chamber axially-extending half of the side wall opposite the chamber axially-extending half of the side wall through which port 34 opens so that the cam surfaces 72 and 74 support the second portion of the device 26. Since the first portion of the device 26 is also supported on surface 730 at its points 718 and 720, the device 26 supports the valve member 24 in the valve chamber in the position shown in FIG. 1 because the engagement of stop 52 with the lower part of surface 740 effectively prevents further downward movement of the valve member main part 40. This obviates what would otherwise be the support-like contact of the valve member base section points 722 and 724 on the valve chamber side wall, keeping the valve member free to more quickly close when fluid flow from port 30 into chamber 26 starts that action and also limiting the maximum valve seat open position of the valve member surface 42. Also, the centroid of the ears 68 and 70 is such that the weight of the device 26 effectively acting on the centroid is slightly unbalanced on its pivot points near the end 46 of the valve member base section 38, tending to keep the device 26 in the position shown in FIG. 1 when the valve seat 36 is open. It should be noted that the deactivating tab section 76 is considerably narrower and is thus made of less material mass than is the second section 62 of blade 26.

Figure 3:
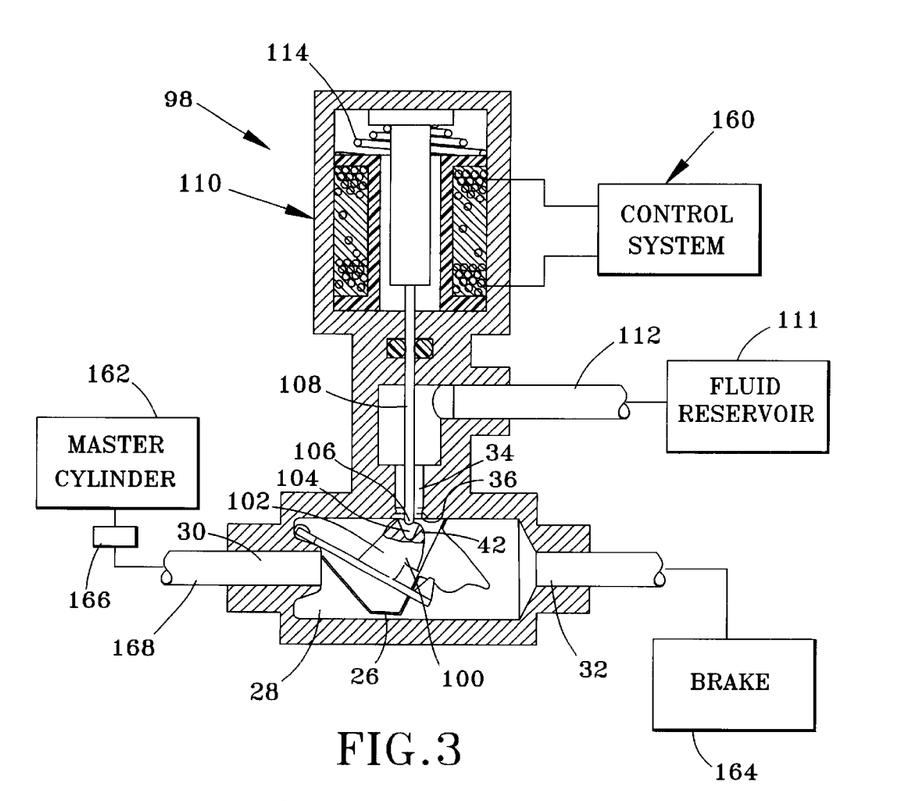
FIG. 3 is a fragmentary cross section view, similar to the view of FIG. 1, showing one example of a fluidic valve assembly having the improved valve mechanism SV employing an axially movable solenoid core. Examples of other fluidic valve mechanisms SV are shown as parts of FIGS. 7 and 8, using a rotary solenoid.

FIG. 3 shows a valve assembly 98 with a valve mechanism 100 similar to that of FIGS. 1, 2(*a*) and 2(*b*), located in the valve chamber 28. The valve mechanism 100 is shown in the at-rest position without any brake fluid pressure flow taking place. The valve assembly 98 is shown as being connected to a suitable control system such as an ABS or traction control system schematically identified as 160.

Valve chamber 28 has ports 30, 32 and 34 as in FIG. 1. When installed in a vehicle, port 30 is connected to receive brake actuating pressure fluid from the master cylinder 162 when the master cylinder is actuated to generate that pressure in the brake fluid. Port 32 is operatively connected to one or more vehicle brakes 164 which are actuated by hydraulic pressure from the master cylinder 162 passing through chamber 28, with the valve seat being closed. Port 32 also provides for the brake fluid return to valve chamber 28 from the brakes 164 upon brake release, and it is this return flow that opens valve seat 36 if the solenoid 110 has not been actuated by the suitable control mechanism 160 such as found in ABS systems. This is the normal operation of the valve when the ABS system control mechanism 160 is not actuated or when it has failed.

Port 30 also provides a fluid exit from valve chamber 28 when the brake actuating pressure from the master cylinder 162 is partially or wholly released, returning the volume of fluid earlier displaced by action of the master cylinder to that master cylinder. Also, with valve seat 36 opened, the returning volume of fluid is also connected through port 34 and brake line 112 to the brake fluid reservoir 111.

The valve member 102 has a valve seat engaging surface 42 which is selectively engageable with and disengageable from the valve seat 36 of port 34. Instead of having the piloting tip 44 as in FIG. 1, valve member 102 has a socket 104 receiving the end 106 of the operating rod 108 which is axially movable downward when the solenoid 110 is energized to lower brake system pressure even though the vehicle operator is maintaining brake actuation of the master cylinder 162. The socket 104 is not secured to the operating rod end 106, but is or comes in contact with that rod end to receive valve-opening force from the solenoid 110 when that solenoid is energized. When the solenoid 110 is electrically deenergized, the return spring 114 will move the operating rod 108 upwardly as seen in FIG. 3, and the rod end 106 will be removed from forcible contact with the valve member socket 104. This permits the valve mechanism 100 to operate in the same manner as does valve mechanism 24 of FIG. 1, closing valve seat 36 once there is fluid flow from port 30 into valve chamber 28, as above described.

The solenoid 110 is controllably energized and deenergized by any suitable control mechanism 160. This mechanism can be anything from a brake pedal release sensor to an ABS or traction control system. It can be seen that, when the suitable control mechanism 160 is not being actuated, or even if the suitable control mechanism fails, so that the solenoid 110 is not energized, the valve mechanism 100 will continue to function to be able to apply and release the brakes, thus providing a fail-safe hydraulic brake actuation not depending upon the availability of electrical control or power in case the ABS or other control system or device fails. This is a very important safety feature for any brake system which depends either primarily or secondarily on electrical and/or electronic controls of any type for its operation and control. If there is no non-electrical backup, failure of a purely electrical brake system will render the vehicle an moving uncontrolled missile on the roads and highways. This is of even more importance when the vehicle steering is also controlled by the electrical system and there is no manual or other non-electric backup system for the steering system as well. One must be able to safely brake the vehicle to a stop even when all of its electrical systems fail—and electrical systems do fail, as well as electrical backups if the primary system fails.

When valve seat 36 is opened, brake fluid entering chamber 28 passes through the valve seat 36 and to the reservoir 111 through brake line 112. When the solenoid 110 is deenergized, if there is still brake fluid pressure coming into chamber 28 through port 30, the valve will again be seated by fluid flow as described above with regard to FIG. 1. This is typically the function when the solenoid is operating as part of an ABS control system. This occurs fairly rapidly in ABS systems, often at 10 to 20 cycles per second. The solenoid 110, or another solenoid not shown, may operate a normally open valve 166 in the brake line 168 to close that valve concurrently with the opening of valve seat 36, and to allow that valve 166 to reopen when the solenoid controlling it is deenergized. The solenoid 110, with its operating rod 108, is a valve member positioning means or device which also includes the blade 26 of the valve mechanism. The solenoid and its operating rod position the valve member 100 when the solenoid is energized, and the blade 26 positions that valve member when the solenoid is then deenergized as well as when the brake system is being operated without the control mechanism 160 acting to energize the solenoid.

Figure 4:
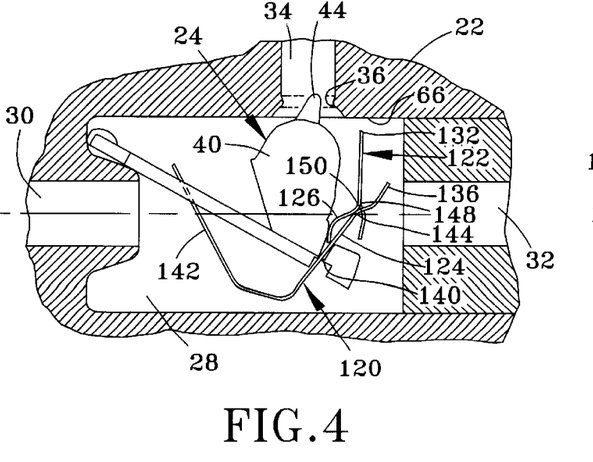
FIG. 4 is a fragmentary cross section view, similar to the view of FIGS. 1 and 3, showing a fluidic valve assembly employing the improved valve mechanism TB.
Figure 5:
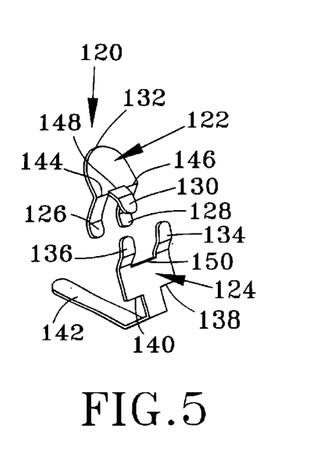
FIG. 5 is an isometric view of a toggle blade positive positioning device which cooperates with the valve member of FIG. 5(a) to form the improved valve mechanism TB.

The disclosure of FIG. 4 is similar to the disclosure of FIG. 1, but a toggle valve blade assembly 120 is used instead of the single-piece blade 26 of FIGS. 1 and 2(*b*). Toggle blade assembly 120 is shown in FIG. 5 with the upper and lower parts 122 and 124 thereof spaced in disassembled relation for clarity. In their assembled relation shown in FIG. 4, it is clear that they are in angular toggle relation. This angular relation changes with toggle action, straightening out so as to become closer to, but not achieving, a 180° straight line relation or planar alignment. As is well known, as the toggle is moved more toward this straight line relation, the forces exerted at each end increase dramatically.

Upper part 122 has lower ears 126, 128 and 130 which serve as pivot stops for the upper part. Ears 126 and 128 are side pivot stops and ear 130 is a center pivot stop. The upper end of the upper part 122 is the bore surface contact point 132.

Lower part 124 has upwardly extending ears 134 and 136 which serve as pivot stops for the lower part. Part 124 has fulcrum points 138 and 140 which are equivalent to lower blade fulcrum points 58 and 60 of the blade 26 of FIG. 2(b). The deactivating tab 142 is equivalent to the deactivating tab 76 of the blade 26 of FIG. 2(b).

The upper and lower parts have mating fulcrum surfaces, with surfaces 144 and 146 at the upper ends of ears 126 and 128 and surface 148 at the base of ear 130 of the upper blade part 122. The lower part 124 has fulcrum surface 150 at the base of the notch formed by ears 134 and 136. To some extent, fulcrum surface 150 also extends on the side parts of the notch formed by the inwardly facing edges of ears 134 and 136.

FIG. 4 shows the assembled toggle blade 120 in the at-rest position in the valve chamber 28. As such, the centroid of the toggle blade assembly upper part 122 is so placed by design as to cause the upper part 122 to pivot about the blade fulcrums 144, 146, 148 and 150 until the upper part stops 126 and 128 touch the lower blade part 124, creating the at-rest position for the upper blade part 122. The lower blade part is also at the at-rest position shown in FIG. 4. It is resting on the fulcrum points of the valve base in the same manner as toggle blade 26 so rests in FIG. 1.

During system apply, fluid flow entering chamber 28 through port 30 lifts the valve member 24 and moves the blade upper part 122 rightwardly as seen in FIG. 4 in a pivotal manner about fulcrums 144, 146, 148 and 150 so that point 132 is moved out of engagement with bore surface 166. This permits the valve member 24 to seat against valve seat 36 and close port 34.

Upon system release, return flow through port 32 into chamber 28 acts first on the blade upper part 122, moving its point 132 into contact with the bore surface 66. Continuing return flow acts on the blade upper part 122 and the blade lower part 124, tending to straighten them out in a toggle action that creates an exponentially increasing force of the toggle blade assembly 120 to open the valve away from valve seat 36. The returning flow goes to the reservoir through open port 34 and back to the master cylinder through port 30. In this type of valve arrangement, this return flow is relatively unrestricted in relation to standard master cylinders with bypass holes.

This toggle blade type of valve member positioning device may be used in the valve assembly 98 of FIG. 3. It is also shown as being used in the some of the valve mechanisms of FIGS. 7 and 8.

FIGS. 6(a), 6(b), 6(c) and 6(d) shows a fluidics valve and toggle blade arrangement much like those in the prior-described FIGURES, and they do not need to again be described in great detail. The differences are in the central openings in the valve member and the toggle blade to accommodate a flow rod assembly. It is also to be understood that a valve member 24 such as member 24 of FIG. 1 and a valve mechanism 20, or even the valve member and mechanism of one of the noted prior patents, may be used in this environment.

The flow rod assembly 200 has a spherical contact surface 202 that actuates the toggle blade assembly 204. Assembly 204 does not have a deactivating tab extending from its lower part 206 as does the toggle blade assembly of FIG. 5, for example. The flow rod assembly 200 serves the deactivating purpose, thus eliminating the need of a deactivating tab section such as 76 of FIGS. 1, 2(b), 3 and 4. The pintle end 208 of the flow rod assembly 200, shown in detail in FIG. 6(c), receives a spring clip 210, shown in perspective in FIG. 6(b). A movable restriction sleeve 212 is mounted on the pintle end 208 of the flow rod assembly 200, and is slidably movable relative to both the flow rod pintle end 208 and the valve assembly housing section 214. Fluid passage grooves 216 extend linearly on the exterior surface of sleeve 212 and there are several of them radially spaced on that sleeve surface. The mating part of the valve housing 214 has a restriction land 218 extending inwardly so as to pilot the fluid passage grooves 216 in an unrestrictive manner until fluid restriction is required.

Spring clip 210 has to return the sleeve 212 to engagement with its stop 220 on the flow rod assembly 200 to attain the at-rest position of the entire valve mechanism.

The port 222 in the valve housing is the inlet/outlet port for brake apply fluid and is comparable to port 30 of FIGS. 1, 3 and 4. Fluid entering it from a master cylinder enters valve chamber 28 in the normal manner and raises the valve member 224 and the toggle blade assembly 204 until the valve member closes seat 36.

When return flow enters the chamber 28 through port 226 upon brake release, the flow rod assembly 200 moves leftwardly as seen in FIG. 6(a) under the influence of the return flow, and the flow rod spherical contact surface 202 engages the toggle blade assembly 204. At this time, the restricting land 228 of sleeve 212 moves toward land 218, creating a fluid flow restriction at the interface of lands 218 and 228. This high level restriction causes the pressure acting on the right end of the sleeve 212 to move the sleeve into the spring clip 210. The force required to collapse the spring clip 210 has been preestablished to the value required to straighten out the toggle blade assembly 204 and force the valve member 224 to be unseated from its seat 36. Return release pressure is then able to flow back to the reservoir and the master cylinder as in other valve assembly configurations.

Figure 7:
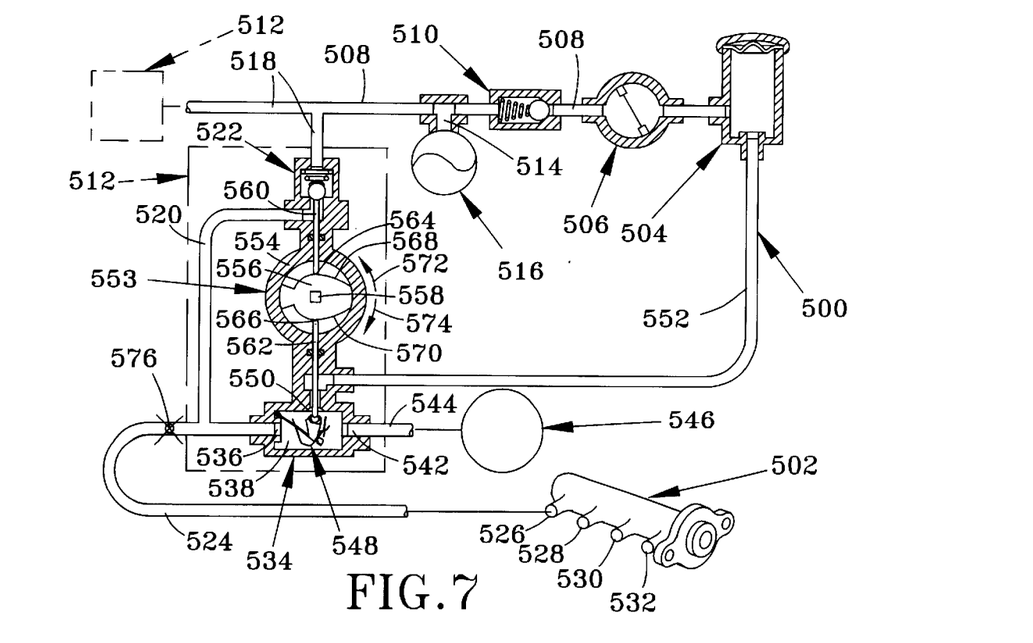
FIGS. 7 and 8 schematically show system arrangements for vehicle brakes in which either or both of ABS sub-systems and traction control sub-systems are used as parts of the overall vehicle brake systems, and one of the fluidic valve assemblies employing one of the improved valve mechanisms herein disclosed. It is within the purview of the broader aspects of the invention that at times one of the fluidic valve mechanisms of U.S. Pat. Nos. 5,003,780 and 5,348,040 may be advantageously employed in Each FIGURE will be described in further detail, so that these sub-system schematics together with their descriptions illustrate wide range of possibilities of use of one or more of the above-described types of fluidic valve assemblies having one of the improved valve mechanisms when ABS and traction control are being considered as part of overall vehicle brake systems.

FIG. 7 shows the most pertinent parts of a braking system for a vehicle having both ABS and Traction Control features as a part of the entire vehicle braking system. Standard well-known parts of the entire vehicle braking system are minimally disclosed because of the schematic nature of the FIGURE. Such standard features as a brake pedal and a power brake booster for operating the master cylinder, and particular wheel brake constructions are not illustrated in any detail. In such boosters and wheel brake construction arrangements, whether the boosters are hydraulic pressure powered or vacuum or positive air pressure powered, and whether the wheel brake constructions are disc brakes or drum brakes, and whether or not the drum brakes are duo servo, or leading-trailing brakes, or other well-known types of drum brakes, are not relevant to the concepts shown. This also applies to any typical vehicle service brake pedal which is operatively actuated and released to normally operate the vehicle brake system.

In the schematic drawing of FIG. 7, the system 500 includes a master cylinder assembly 502 which is suitably actuated operatively by a brake pedal arrangement not shown, and may have a power brake booster installed between the brake pedal and the master cylinder, also not shown. The system 500 also includes a brake system fluid reservoir 504, which may be of any suitable type, but which can advantageously be of a reservoir like that disclosed and claimed in U.S. Pat. Nos. 5,182,911 and 5,261,235 noted above. A hydraulic pressure pump 506 pumps brake fluid from the reservoir 504 through brake line portion 508 and a check valve 510. As schematically shown, check valve 510 prevents reverse fluid flow back into the reservoir 504 through the pump 506.

Pressurized brake fluid is then delivered through another brake line portion 518 to another ABS/traction control module 512, one of which is shown as being contained in a dashed line box containing various elements described below in further detail. There are four of these modules 512 when the ABS system controls each of the four wheel brakes of a typical four-wheel braked vehicle. In the particular master cylinder 502, there are four pressurizing chambers and four pressure outlets as will be further described. This can be made in a practical manner when the master cylinder has no by-pass holes and therefore there are no connections to the fluid reservoir with each by-pass hole.

If a master cylinder such as that now in common use and known as a dual master cylinder is used and has by-pass hole connections to the fluid reservoir, or if a two-outlet master cylinder having no by-pass holes is used, one brake pressure line from one of the outlets may be Y-connected to two modules 512 so that those two modules each control one of two vehicle wheel brakes, and one brake pressure line from the other of the outlets may be Y-connected to two other modules 512 so that those two other modules each control one of two other vehicle wheel brakes. Further below, there is a caution about using a master cylinder with bypass holes in this arrangement when traction control by selective braking of one or more vehicle drive wheel brakes is installed.

Fluid pressure from pump 506 flowing through the part of line portion 508 connecting the check valve 510 with the several line branches 518 leading to each of the several modules 512 is connected through a line branch 514 to a pressure accumulator 516 if an accumulator is to be used in the system. If the system is to be run directly from pump pressure generated by pump 506 rather than an accumulator, accumulator 516 and the line branch 514 serving it are omitted.

Within each module 512, and as more specifically shown in the module identified as in a dashed-line box, line branch 518 also connects to a fluid pressure line 520 through a normally closed check valve 522, and line branch 520 is connected to a brake pressure line 524 leading from one of the outlet ports 526 of master cylinder assembly 502. The master cylinder assembly is shown as having other outlet ports 528, 530 and 532, which are connected to line branches similar to line branch 524 and through such line branches to other modules 512. Brake pressure line 524 is connected to a fluidic valve assembly 534 at one end 536 of the valve chamber 538 of valve housing 540. The other end 542 of chamber 538 is connected by brake line 544 to one of the four vehicle brakes 546. The fluidic valve 548 is so positioned that fluid flow from brake line 524 into chamber end 536 urges the valve 548 closed relative to its seat 550, while fluid flow from brake 546 into chamber end 542 tends to open valve 548 relative to its valve seat 550. The portion of the valve housing 540 fluid connecting with the one side of valve seat 550 opposite chamber 538 is connected by brake line 552 to the reservoir 504 so that brake fluid under pressure from the vehicle brake 546 is returned to the reservoir 504 when the valve 548 is open relative to its valve seat 550.

The bi-directional arcuately rotatable cam assembly 553 includes a cam housing 554 in which cam 556 is rotatably mounted. Cam 556 is driven by a bi-directional rotary solenoid of which only the drive shaft 558 is shown. Actuating rod cam followers 560 and 562 have their respective inner ends 564 and 566 engaging the mirror-image shaped cam surfaces 568 and 570. They are shown in a neutral position. The cam 556 is rotated in a counter-clockwise direction shown by arrow 572 when the ABS/traction control requires brake application of the wheel brake 546. When this counter-clockwise movement of the cam 556 occurs, the cam follower 560 is forced upwardly to open check valve 522, and the cam follower 562 holds its axial position, its inner end 566 riding with the cam along a constant radius arc portion of the cam to permit the fluidic valve 548 to remain closed against its seat 550. The valve 548 is being held closed against its seat 550 when there is brake apply pressure being delivered to the wheel brake 546 during normal braking as well as during traction control brake apply.

The cam 556 is rotated in the clockwise direction indicated by arrow 574 when the ABS/traction control requires some brake release of the wheel brake 546. When this clockwise movement of the cam 556 occurs, the cam follower 562 is forced downwardly to open fluidic valve 548 relative to its valve seat 550, and the cam follower 560 holds its axial position, its inner end 564 riding with the cam along a constant radius arc portion of the cam to permit the check valve 522 to close against its seat. With the closure of the check valve 522 and the forced opening of the fluidic valve 548, some brake fluid under brake actuating pressure is released from the wheel brake 546 to the reservoir 504, diminishing the amount of braking force at that wheel brake.

The earlier mentioned caution when a master cylinder with bypass holes is used with traction control in this system will now be described. There must be a solenoid (or other similarly controlled) shut-off valve 576 placed in each brake line 524 between the master cylinder outlet connected therewith and the juncture of brake line 520 with brake line 524. It must be closed under control of the tract-on control when braking is required of the vehicle wheel brake 546 since traction control braking typically occurs when the master cylinder is in full brake release, and the bypass holes are in open connection with the reservoir and the master cylinder pressurizing chambers. Otherwise, any brake actuating pressure flowing from the pump 506 or the accumulator 516 with the check valve 522 open would flow directly to the reservoir 504 through the valve chamber 538 and traction control braking of wheel brake 546 could not be attained.

Figure 8:
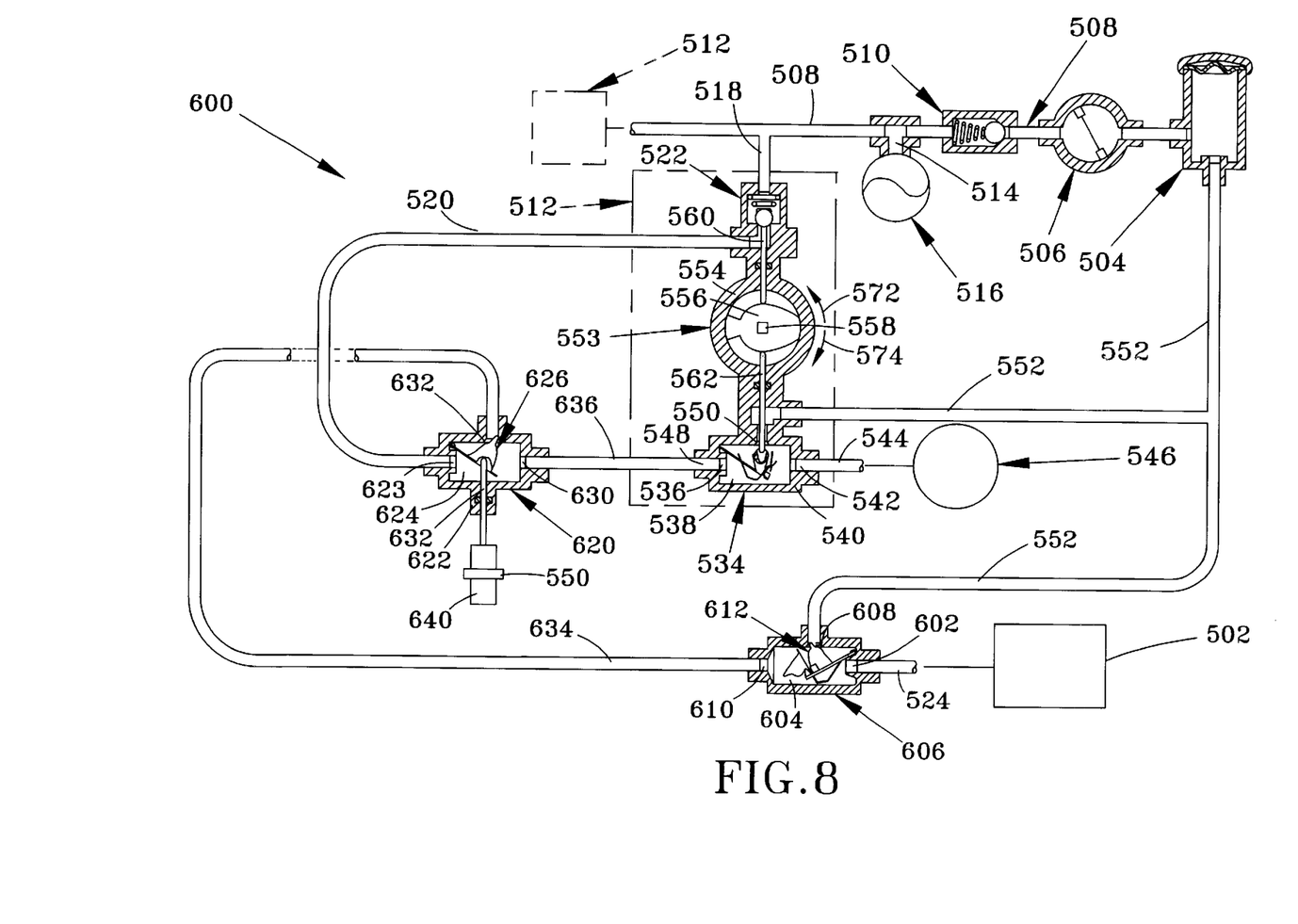

The schematic system 600 of FIG. 8 is similar to system 500 of FIG. 7. System 500 is what is known as a pedal thumper type in which there is a thumping force exerted on the brake pedal felt by the vehicle operator when the brakes are being applied via the brake pedal and the ABS system is cycling the brake pressure operating the vehicle brakes to minimize or eliminate wheel skid. Many vehicle operators find the cyclic pedal thumping to be annoying, and its presence is often followed by an instinctive reaction to release the brake pedal. While this can cause the thumping to cease, it does so by ceasing the ABS control operation so that there is usually much less effective braking effort being applied to stop the vehicle than when the ABS is permitted to continue its function. This then leads to greater than optimum stopping distance than can often be attained by continued ABS operation. It is therefore desirable to be able to use a system that would otherwise produce pedal thumping without actually having it occur. If, as some in the field contend, the pedal thumping is an indication that the ABS system is activated and working, other indications which do not often cause the vehicle operator to ease off or release the brake pedal can be provided and eliminate this possibility. Lights or sound devices can be used instead, by way of example.

Since much of system 600 is identical to system 500 of FIG. 7, the same reference characters are used where appropriate. Also, the description of the functions of these similar elements is kept to a minimum, it being understood that these similar elements function in FIG. 8's system 600 in the same manner that they do in FIG. 7's system 500.

During a normal brake actuation, the master cylinder 502 generates brake actuating pressure in brake line portion 524, which delivers that pressure to the valve chamber inlet 602 of the fluidic valve assembly valve chamber 604 of fluidic valve assembly 606. Chamber 604 has a valve seat 608 to which one end of brake line 552 is connected. As in system 500, brake line 552 is the return line for brake fluid to the reservoir 504. Another part of line 552 is also connected to the valve seat 550 of valve assembly 534, and functions in the same manner as it does in system 500. Valve assembly 606 also has another inlet/outlet 610 opening into chamber 604, and a fluidic valve 612. The valve 612 is shown as being of the cam-eared blade type disclosed in FIGS. 1 and 2(*a*) and 2(*b*). However, it may be of other disclosed types as well as valves disclosed in the earlier-noted patents.

Another valve assembly 620 is provided. It includes a valve housing 622 having a valve chamber 624 formed therein and containing a fluidic valve 626. Chamber 624 has a first inlet/outlet 628, a second inlet/outlet 630 and a valve seat 632. Brake line 634 connects inlet/outlet 610 of valve assembly 606 with the valve seat 632 of valve assembly 620. Brake line 520 has one end connected with inlet/outlet 628 of valve assembly 620. Another brake line 636 connects inlet/outlet 630 of valve assembly 620 with the inlet/outlet 548 of valve assembly 534.

Valve 626 is arranged to be closed by solenoid-actuated cam follower 638 by a cam 640 mounted on the rotary solenoid shaft 558 of bi-directional arcuately rotatable cam assembly 553. Cam 640 is also rotatable in cam housing 554, and is so shaped that, when cam follower 562 forces valve 548 away from its valve seat 550, valve 626 is closed against its seat 632. Likewise, when cam follower 562 no longer holds valve 548 away from its valve seat 550, valve 626 is openable by fluid flow entering valve chamber 624 through valve seat 632 when brake actuating pressure is generated by master cylinder 502 and transmitted through valve chamber 604 (valve 612 being closed by the flow from inlet/outlet 602 toward inlet/outlet 610), brake line 634 and valve seat 632. Also, the valve 626 can open simply by dropping away from its valve seat 632 since it will no longer be supported by the cam 640 and its cam follower 638.

During normal brake apply, flow from the master cylinder 502 closes fluidic valve 612 and passes through brake line 634 through valve seat 632, valve chamber 624, and brake line 636, then through inlet/outlet 536. The fluid flow into valve chamber 538 acts on fluidic valve 548, moving the valve to close the valve seat 550 and therefore sealing of the fluid connection between valve chamber 538 and brake return line 552. Fluid pressure continues through valve chamber 538, inlet/outlet 542 and brake line 544 to actuate the wheel brake 546. Other ABS/traction control modules 512 are also connected to be similarly activated to cause brake pressure activation of the other wheel brakes controlled by those other modules.

When the bi-directional arcuately rotatable cam assembly 553 is moved in the direction of arrow 572 for ABS/traction control apply as earlier described, cam 640 acts to move cam follower 638 upwardly as seen in the drawing to close valve 626 against its seat 632, preventing any brake fluid pressure in brake line 634 from being dumped from the master cylinder to the reservoir. By maintaining the brake pressure in brake line 634, there is no thumping pressure release action felt by the brake pedal through the master cylinder 502. When the cam assembly 553 is returned to the neutral position shown under control of the ABS/traction control command center, the brake actuating pressure from the master cylinder 502 again acts on the vehicle wheel brake 546 as before during normal brake apply.

When cam assembly 553 is moved in the direction of arrow 572 for traction control while there is no brake actuating pressure acting on the wheel brake 546 from master cylinder 502, check valve 522 is opened and fluidic valve 548 is closed against its seat 550. At the same time, cam 640 may act through cam follower 638 to close valve 626 against its seat 632. The fluid flow from brake line 520 through inlet/outlet 628 also acts on the fluidic valve 626 to assist in moving it so that it closes against its seat 632. Brake actuating pressure from pump 506 or accumulator 516 (if used) passes through brake line 520, valve chamber 624, brake line 636, valve chamber 538 and brake line 544 to actuate the wheel brake 546 in the traction control mode. When the traction control is no longer active to actuate wheel brake 546, the system returns to the normal no-braking, no ABS, no traction control mode.

What is claimed is:

1. A fluid flow sensitive valve assembly comprising a chamber having axially opposite first and second end walls connected by a cylindrical chamber side wall, said chamber being provided with at least first, second and third fluid flow inlet/outlets, said first and second fluid flow inlet/outlets respectively being in said first and second end walls of said chamber and said third fluid flow inlet/outlet being in said side wall of said chamber;

a fluid flow sensitive valve member in said chamber sensitive to fluid flow between said first and second fluid flow inlet/outlets in one direction to be moved at least in part by fluid flow in said one fluid flow direction to close said third fluid flow inlet/out, preventing fluid flow therethrough, and also sensitive to fluid flow between said first and second fluid inlet/outlets in the opposite fluid flow direction to be moved at least in part by fluid flow in said opposite fluid flow direction to open said third fluid flow inlet/outlet, permitting fluid flow therethrough;

and valve member positioning means including a valve member positioning device for said valve member for positioning said valve member in said chamber, said valve member positioning device comprising:
a first valve member positioning device portion having first and second fluid flow-impingeable surfaces,
a second valve member positioning device portion having third and fourth fluid flow-impingeable surfaces,
and a third valve member positioning device portion interconnecting said first and second device portions at such an angle that
said valve member positioning device has at least a main portion of said valve member received between said second and third fluid flow-impingeable surfaces,
said first fluid flow-impingeable surface faces said first fluid flow inlet-outlet
and said fourth fluid flow-impingeable surface faces said second fluid flow inlet-outlet;

said fluid flow positioning device second portion having at least one edge surface engaging said valve member in device-pivoting relation for relative pivotal movements between said valve member and said fluid flow positioning device within said chamber;

said fluid flow positioning device first portion having a first end opposite the point of its interconnection with said fluid flow positioning device third portion, at least one contact point on said first portion first end being selectively engageable with said chamber first end wall and which when so engaged locates said fluid flow positioning device first portion in a pivotable relation to said chamber first end wall;

said fluid flow positioning device second portion having a second end opposite the point of its interconnection with said fluid flow positioning device third portion and a contact point selectively engageable with said chamber side wall adjacent to said third inlet/outlet and which when so engaged locates said fluid flow positioning device third portion in a potentially pivotable relation to said chamber side wall, said fluid flow positioning device second portion further having additional pivot points thereon, and pivot points engageable with said additional pivot points being provided on a part of said fluid flow sensitive valve assembly for further control of the position and movements of said valve member in said chamber;

fluid flow from said second inlet/outlet into said chamber when occurring impinging on said valve member positioning device second portion fourth flow-impingeable surface and also on said valve member positioning device first portion second flow-impingeable surface and by the force of such fluid flow impingements causing said second valve member positioning device second portion to pivot on said valve member on said second portion's at least one edge surface and causing said second valve member positioning device second portion second end at least one contact point to be moved into engaged relation with said chamber side wall adjacent to said third inlet/outlet and to apply at least to in part force acting on and causing said valve member to be moved in said chamber to close said third fluid inlet/outlet and thus preventing fluid flow from said second inlet/outlet through said chamber and out through said third inlet/outlet so that fluid flow from said second inlet/outlet into said chamber may exit said chamber only through said first inlet/outlet;

fluid flow from said first inlet/outlet into said chamber when occurring impinging on said valve member positioning device first portion first flow-impingeable surface and also on said valve member positioning device second portion third flow-impingeable surface and by the force of such fluid flow impingements causing said second valve member positioning device second portion to pivot on said valve member on said second portion's at least one edge surface and causing said second valve member positioning device second portion second end at least one contact point to be in disengaged relation with said chamber side wall adjacent to said third inlet/outlet and to apply at least to in part force acting on and causing said valve member to be moved in said chamber to open said third fluid inlet/outlet and thus permitting fluid flow from said first inlet/outlet through said chamber and out through said third inlet/outlet, said valve mechanism valve positioning means including at least one of said valve member positioning devices selected from one of the following positioning device types: (a) having a cam-eared blade; (b) having a flow rod combined with a blade; (c) having a toggle blade; (d) having a blade and a solenoid operated push rod operatively driven by a signal-controlled solenoid selectively energized to force movement of said valve member to open said valve chamber third inlet/outlet and upon deenergization of said solenoid so that said push rod is ineffective to prevent closure of said valve chamber third inlet/outlet while permitting said blade and said valve member to continue to control the opening and the closing of said third inlet/outlet in response to fluid flows into said valve chamber.

2. In the fluid flow sensitive valve assembly of claim 1, said included valve mechanism positioning device being a cam-eared blade type, said fluid flow positioning device second portion additional pivot points being ear portions extending from said device second portion from said fourth flow-impingeable surface in generally parallel relation and in a direction generally toward but spaced from said chamber second end wall, each of said ear portions having a cam surface thereon which, when said third inlet-outlet is open as set forth above, engages a point on said chamber side wall located on the chamber axially-extending half of said chamber side wall opposite the chamber axially-extending half of said chamber side wall through which said third inlet/outlet is formed so that said points on said chamber side wall are chordally opposed, said ear portions cam surfaces supporting said fluid flow positioning device on said chamber side wall at said chordally opposed points and said fluid flow positioning device in turn supports said valve member at the limit of its position wherein said third inlet/outlet is opened to its permissible maximum.

3. In the fluid flow sensitive valve assembly of claim 1, said included valve member positioning device being of said toggle blade type, said fluid flow positioning device second portion being formed with an upper part and a lower part connected through a toggle arrangement, said lower part being that part connecting with said device third portion and each of said device second portion parts have a portion of said device second portion third and fourth fluid flow-impingeable surfaces; said lower part toggle connection being formed by a pair of ears defining a notch therebetween, said pair of upwardly extending ears being bent slightly out of the plane of said device second section in a direction generally toward said chamber second end wall;

said upper part has a pair of downwardly extending ears forming stops spaced apart with a third downwardly extending ear being formed therebetween and forming a stop, said pair of downwardly extending ears being bent slightly out of the plane of said device second section third fluid-impingeable surface and engageable with that portion of said third fluid-impingeable surface on said lower part, said third downwardly extending ear being bent slightly out of the plane of said device second section fourth fluid-impingeable surface and positioned within said notch of said lower part so that the base of said notch and the base of said third downwardly extending ear form fulcrum surfaces which are said device second portion additional pivot points and said additional pivot points on a part of said fluid flow sensitive valve assembly;

said upper part centroid being so located relative to said lower part to cause said upper part to tend to pivot about said fulcrum surfaces until the pair of downwardly extending ears touch the third fluid-impingeable surface of said lower part and establish an at-rest position of said upper part relative to said lower part which in turn is at an at-rest position on said valve member.

4. A valve assembly comprising:
a valve housing having a valve chamber therein, said chamber having first, second and third inlet/outlets and a side wall,
a fluidic valve mechanism including a valve member and valve member positioning means, at least said valve member being in said valve chamber,
said valve mechanism being sensitive to fluid flow a fluid flow signal from said first inlet/outlet into said valve chamber to close said third inlet/outlet and permit fluid flow from said first inlet/outlet to take place through said valve chamber only into said second inlet/outlet,
said valve mechanism also being sensitive to a fluid flow signal from said second inlet/outlet into said valve chamber to open said third inlet/outlet and permit fluid flow from said second inlet/outlet to take place through said valve chamber into said first and third inlet/outlets,
said valve mechanism valve member positioning means acting in response to a first signal to at least assist in positioning said valve member in position where said third inlet/outlet is closed by said valve member, and acting in response to a second signal to at least assist in positioning said valve member in position where said third inlet/outlet is opened by movement of said valve member;
said valve mechanism valve member positioning means including a valve member movement blocker blocking said valve member from closing said third inlet/outlet while said third inlet/outlet is open and said valve member positioning means acting in response to said first signal to remove said valve member movement blocker from blocking said valve member and thereafter acting with said valve member in responding to said first signal to close said third inlet/outlet.

5. The valve assembly of claim 4, said valve mechanism valve member positioning means further having a portion thereof supporting said valve member in said fluid chamber so that said valve member has no supporting contact with said side wall of said valve chamber.

6. The valve assembly of claim 5 wherein said portion supporting said valve member in said fluid chamber includes a pair of ears having cam edges on parts thereof extending away from the area of said third inlet-outlet, said cam edges engaging chordally opposing parts of said valve chamber side wall and supporting said portion and said valve member so that said valve member is prevented from contacting said opposed parts of said valve chamber side wall.

7. The valve assembly of claim 4 wherein said valve mechanism valve member positioning means is a blade having a fluid flow-impingeable surface area part pivotally received on said valve member for pivotal movements relative thereto with said blade being in a valve member supportable relation thereto, said fluid-flow impingeable surface area part having ears extending generally axially of said valve chamber, each of said ears having a cam surface thereon which is engageable with said valve chamber side wall when said valve member is in the position wherein said third inlet/outlet is open to said valve chamber, said valve member being supported away from said valve chamber side wall by said blade fluid-flow impingeable surface area part through said cam ears and said cam surfaces, said fluid flow signal from said first inlet/into said valve chamber being said first signal received by said valve mechanism valve member positioning means and said fluid flow signal from said second inlet/outlet into said valve chamber being said second signal received by said valve mechanism valve member positioning means.

8. The valve assembly of claim 4 wherein said valve mechanism valve member positioning means is a blade having a fluid flow-impingeable surface area first part pivotally received on said valve member for pivotal movements relative thereto and a fluid-flow impingeable surface area second part pivotally mounted on said first part in angular toggle relation and having an end opposite said first part engageable with said valve chamber side wall adjacent to said third inlet/outlet to prevent said valve member from closing said third inlet/outlet, and when said fluid flow signal from said first inlet/outlet impinges on said second fluid-flow impingeable surface area second part, said second part is pivoted on said first part, moving said second part out of engagement with said valve chamber side wall, permitting said fluid flow signal from said first inlet/outlet to act as said first signal to transmit its impingement force to said valve member and move said valve member to close said third inlet/outlet and allow fluid flow from said first inlet/outlet through said valve chamber and out said second inlet/outlet;
and upon the decrease of said fluid flow signal from said first inlet/outlet the fluid flow in said valve chamber reversing direction so that said fluid flow signal from said second inlet/outlet acts in impinging relation on said valve member to move said valve member to open said third inlet/outlet, and also acts on said second part as said second signal and pivots said second part on said first part, engaging said second part end with said valve chamber side wall and preventing said valve chamber from closing said third inlet/outlet so that fluid flow from said second inlet/outlet flows out of said valve chamber through said third inlet/outlet and may also flow out of said valve chamber through said first inlet/outlet, with continued fluid flow impingement on said second part from said second inlet/outlet acting by toggle action tending to straighten said first and second parts nearer a planar alignment to apply an increasing force occurring because of said toggle action on said first part to move said valve member further away from said third inlet/outlet, further opening said inlet/outlet.

9. The valve assembly of claim 8 in which said valve mechanism valve member positioning means further includes a fluid flow rod sensitive to said fluid flow signal from said second inlet/outlet and acting in response thereto to engage said toggle at the juncture of said toggle first and second parts and adding force tending to straighten out the angular relation of said first and second parts.

10. The valve assembly of claim 4 in which said valve mechanism valve member positioning means further includes a push rod extending through said third inlet-outlet and having an end, said third inlet-outlet and said valve member respectively having engageable and disengageable first and second annular seating surfaces for selectively opening and closing said third inlet-outlet, said valve member having an open socket extending axially through said valve member second annular surface and receiving said rod end therein only in pushing relation, said rod being selectively movable into engagement with and out of engagement from said socket and when moved into engagement with said socket moving said valve member second annular surface away from said inlet/outlet first annular surface, said rod having power means for controlling and moving said rod, said power means being adapted to be responsive to a control signal which is a part of a control system.

11. The valve assembly of claim 10 in which said rod power means is a solenoid having a linearly movable solenoid core attached to the other end of said rod and a spring continually urging said solenoid core and said rod away from said valve member socket, energization of said solenoid overcoming said spring to move said rod end into force engagement with said valve member socket.

12. The valve assembly of claim 10 in which said rod power means is a solenoid having a arcuate position controllable rotationally movable solenoid core and a cam attached to said core for arcuate rotation therewith, the other end of said rod being engaged in cam-following relation with said cam so that in arcuate rotation of said cam to one cam arcuate position said rod is moved into force engagement with said valve member socket, and in another cam arcuate position said rod is free to be moved by said valve member in the direction away from said valve chamber and said rod thereafter remains free from engagement with said socket until said rotary solenoid is energized and moved said cam to said one arcuate position.

13. The valve assembly of claim 10 in which, when said rod is in its position wherein it is disengaged from said socket and is responsive to no signal, said valve mechanism valve member and blade function are fully capable of acting independently of said rod to cause said annular surfaces to be disengaged to open said third inlet/outlet and to be engaged to close said third inlet/outlet.

14. The valve assembly of claim 13 in which said valve member movement blocker is a cam-eared blade.

15. The valve assembly of claim 13 in which said valve member movement blocker is a toggle blade.

16. The valve assembly of claim 4 in which said valve mechanism valve member positioning means includes a blade pivotally mounted on said valve member and including said valve member movement blocker, said valve chamber having a fluid flow sensitive rod extending axially therethrough as well as extending though openings in said blade and said valve member, said rod having a first end being a pintle end having a movable restriction sleeve thereon provided with externally grooved passages with said pintle end and said sleeve slidably extending into said first inlet/outlet, said first inlet/outlet having an internal land therein with which said pintle externally grooved passages mate in slidable variable fluid flow restricting relation, said rod having a second end having axially extending, circumferentially spaced flutes thereon extending into said second inlet/outlet for axial slidable movement therein, said axially fluted second end having a land portion at the end of said flutes having the diameter of said flutes and positioned so that when it is moved axially toward said blade it engages said blade and applies a force to said blade in addition to the fluid flow impingement force applied to said blade by said second signal moving said valve member movement blocker so as to block said valve member from closing said third inlet/outlet as aforesaid, and a reversely bent leaf spring positioned through a transverse opening in said pintle end with its free ends extending outwardly about the outer end of said pintle end and engageable with the outer end of said sleeve as well as the internal surface of said sleeve through which said pintle end extends so that it urges said sleeve toward said valve member and toward a shoulder on said rod; fluid flow pressure acting on said sleeve and said rod first end as it enters said valve chamber through said first inlet/outlet and moving said rod further into said second inlet outlet, said fluid flow also acting on said valve member to close said third inlet/outlet; and upon release of the pressure applied through said first inlet/outlet said rod being moved in a direction toward said first inlet/outlet, restricting fluid flow out of said valve chamber through said first inlet/outlet and opening fluid flow through said fluted passages into said valve chamber, moving said blade to block said valve member from closing said third inlet/outlet and causing said blade to apply additional force to move said valve member away from said third inlet/outlet.

17. Said valve assembly of claim 16, said blade being a toggle action blade so that said additional force applied to move said valve member away from said third inlet/outlet is increased by the toggle action of said blade.

18. A fluid flow sensitive valve assembly (18) comprising:

a housing (22) having a valve mechanism (20) received in a valve chamber (28) formed in said housing;

said valve chamber having a cylindrical side wall (66), axially spaced first (700) and second (702) end walls, first (30) and second (32) ports respectively opening through said first and second valve chamber end walls, and a third port (34) opening through a valve seat (36) formed in said cylindrical side wall at a point axially intermediate said end walls, said axially spaced first end wall including an annular section (704) through which said first port is axially formed, said annular section extending axially toward said second end wall of said valve chamber;

said valve mechanism including a valve member (24) juxtaposed to said valve seat and movable relative thereto into seated and unseated positions to respectively close and open said third port, said valve member having a substantially planar body base section (38) defined by upper (708) and lower (710) base sides and first (712) and second (46) base ends, said valve member also having a valve main body section (40) extending outwardly from said planar body base section upper side intermediate said first and second ends of said planar body base section, said valve main body section including a surface portion (42) selectively engageable in seated relation with said valve seat and disengageable from said valve seat in unseated relation therewith;

and valve member positioning means (26) mounted on said valve member and movable with said valve member as said valve member moves between its seated and unseated positions relative to said valve seat;

said valve member positioning means having a maximum width less than the diameter of said valve chamber between said end walls and having one end (62) thereof positioned near said second port and including a valve mechanism position location point (64) thereon engageable with said valve chamber side wall intermediate said second and third ports;

said valve member having first (716, 718, 720) and second position location points (722, 724), said first position points being only on said planar body section first end and said second valve position location points being a pair of such points laterally opposite each other and formed on a portion (726) of said planar body section defined as that part of said planar body section from and including said planar body section second end to that intermediate part of said planar body section intersected by a lateral plane extending through the axis (29) of said main valve body section, said first valve position location points being engageable with at least one part of said valve chamber first end wall and the surface (730) of said axially extending annular section, said second valve position location points being engageable with said valve chamber side wall intermediate said valve chamber end walls for locating said valve mechanism in said valve chamber so that said valve member is unseated from said valve seat when there is no fluid flow through said valve chamber and also when there is fluid flow from said second port to said first port through said valve chamber and said valve member is seated on said valve seat to close said valve seat and said third port when there is fluid flow from said first port to said second port through said valve chamber;

and fluid flow-impingeable surfaces (732, 734, 736, 738, 740, 742) on said valve mechanism acting when fluid flow impinges thereon from said first port to said second port to move said valve mechanism from the valve member unseated position to the valve member seated position relative to said valve seat and acting when fluid flow impinges thereon as fluid flows toward said first port in said valve chamber from at least one of said second and third ports to move said valve mechanism from the valve member seated position to the valve member unseated position relative to said valve seat; the improved valve member positioning means comprising:

a first fluid flow-impingeable surface (736) acted on by fluid flow from said first port into said valve chamber to initiate movement of said valve mechanism toward valve member seating on said valve seat, such valve mechanism movement causing said valve member positioning means one end (62) to move said one end location point (64) into engagement with said valve chamber cylindrical side wall (66);

said valve member planar body section lower side being a second fluid flow-impingeable surface (732) subject to the fluid flow from said first port into said valve chamber, that fluid flow then continuing to act on said first and second fluid flow-impingeable surfaces to cause pivotal movement of said valve mechanism about said valve member positioning means one end (716) to seat said valve member on said valve seat and close said third port;

said valve member positioning means having a third fluid flow-impingeable surface (740) which when acted on by fluid flow from said first port into said valve chamber initiates pivotal movement of said valve mechanism about said valve member positioning means end (62) to unseat said valve member from said valve seat;

said valve member positioning means further having a fourth fluid flow-impingeable surface (742) which is also acted on by fluid flow from said second port into said valve chamber to hold said positioning means one end location point into continued pivot point contact with said valve chamber cylindrical side wall and prevent closing of said valve seat by said valve member so long as there is fluid flow from said second port into said valve chamber.

* * * * *